(12) United States Patent
Meng et al.

(10) Patent No.: US 12,125,371 B2
(45) Date of Patent: Oct. 22, 2024

(54) METHOD FOR GENERATING HAPTIC FEEDBACK SIGNAL, ELECTRONIC DEVICE, AND STORAGE MEDIUM

(71) Applicant: AAC Acoustic Technologies (Shanghai)Co., Ltd., Shanghai (CN)

(72) Inventors: Zengyou Meng, Shenzhen (CN); Yajun Zheng, Shenzhen (CN); Zheng Xiang, Shenzhen (CN)

(73) Assignee: AAC Acoustic Technologies (Shanghai)Co., Ltd., Shanghai (CN)

( * ) Notice: Subject to any disclaimer, the term of this patent is extended or adjusted under 35 U.S.C. 154(b) by 70 days.

(21) Appl. No.: 18/091,344

(22) Filed: Dec. 29, 2022

(65) Prior Publication Data

US 2024/0087434 A1 Mar. 14, 2024

Related U.S. Application Data

(63) Continuation of application No. PCT/CN2022/133520, filed on Nov. 22, 2022.

(30) Foreign Application Priority Data

Sep. 13, 2022 (CN) .......................... 202211118787.2

(51) Int. Cl.
*G08B 6/00* (2006.01)
(52) U.S. Cl.
CPC ...................................... *G08B 6/00* (2013.01)
(58) Field of Classification Search
CPC ........................................................ G08B 6/00

USPC ....................................................... 340/407.1
See application file for complete search history.

(56) References Cited

U.S. PATENT DOCUMENTS

| | | | | |
|---|---|---|---|---|
| 2015/0154966 | A1* | 6/2015 | Bharitkar | G10L 19/008 381/23 |
| 2018/0204426 | A1* | 7/2018 | Nagisetty | H04B 1/385 |
| 2018/0284758 | A1* | 10/2018 | Cella | H04L 1/18 |
| 2018/0301140 | A1* | 10/2018 | Turcott | G06N 3/044 |
| 2020/0265119 | A1* | 8/2020 | Desai | G06F 18/2135 |
| 2021/0110841 | A1* | 4/2021 | Weber | G10L 21/06 |
| 2022/0369031 | A1* | 11/2022 | Lester | G10K 11/1752 |
| 2024/0045505 | A1* | 2/2024 | Payal | G06F 3/16 |

* cited by examiner

*Primary Examiner* — Jack K Wang
(74) *Attorney, Agent, or Firm* — W&G Law Group (57) ABSTRACT

Provided are a method for generating a haptic feedback signal, an electronic device, and a storage medium. The method includes: acquiring an initial haptic feedback signal; mapping an initial haptic feedback signal from a time domain to a frequency domain to obtain an initial spectrogram of the initial haptic feedback signal in the frequency domain; adjusting an amplitude value of a harmonic component of any frequency band in the initial spectrogram to obtain a target spectrogram; and mapping a signal corresponding to the target spectrogram from the frequency domain to the time domain to obtain a target haptic feedback signal. In the present application, a large number of haptic feedback signals with different haptic feedback effects may be obtained by adjusting the amplitude value of the harmonic component of any frequency band in the initial spectrogram, thereby effectively improving the richness of the haptic feedback signals.

10 Claims, 7 Drawing Sheets

METHOD FOR GENERATING HAPTIC FEEDBACK SIGNAL, ELECTRONIC DEVICE, AND STORAGE MEDIUM

TECHNICAL FIELD

The present application relates to the technical field of haptic feedback, in particular to a method for generating a haptic feedback signal, an electronic device, and a storage medium.

BACKGROUND

Haptic feedback technology is a novel feedback technology following auditory feedback and visual feedback technologies and is widely applied to various electronic devices, especially consumer electronic devices such as mobile phones and tablet computers. The haptic feedback technology is a haptic feedback mechanism combining hardware and software and assisting actions such as acting force or vibration, which is intended to simulate a real haptic experience of a person, so that the user can obtain a more intensive immersion sensory experience with a sense of reality.

In the related art, many haptic feedback signals are usually stored before an electronic device is delivered from a factory. These haptic feedback signals are designed by designers in advance and have different haptic feedback effects. In practical applications, the electronic device may call different haptic feedback signals according to different trigger instructions (e.g., click, long-press, and slide) input by the user, and inputs the called haptic feedback signal into a haptic feedback device (such as a motor and a brake), so that the haptic feedback device outputs a corresponding haptic feedback action (such as an acting force and a vibration) according to the received haptic feedback signal to provide the user with a corresponding haptic feedback effect. However, there are two common drawbacks for designers in designing haptic feedback signals. Firstly, a relatively long time is required for the designers to design a large number of haptic feedback signals, resulting in relatively poor quickness. Secondly, haptic feedback corresponding to a haptic feedback signal has a single effect and is not highly abundant.

Therefore, it is necessary to improve the above-mentioned method for generating haptic feedback signals.

SUMMARY

An object of the present application is to provide a method for generating a haptic feedback signal, an electronic device, and a storage medium, so as to solve the problem in the related art that haptic feedback effects corresponding to haptic feedback signals are single and the richness is not high.

In order to solve the above-mentioned technical problem, in the first aspect, an embodiment of the present application provides a method for generating a haptic feedback signal, comprising:
  acquiring an initial haptic feedback signal;
  mapping the initial haptic feedback signal from a time domain to a frequency domain to obtain an initial spectrogram of the initial haptic feedback signal in the frequency domain;
  adjusting an amplitude value of a harmonic component of any frequency band in the initial spectrogram to obtain a target spectrogram; and
  mapping a signal corresponding to the target spectrogram from the frequency domain to the time domain to obtain a target haptic feedback signal.

In the second aspect, an embodiment of the present application provides an electronic device, comprising a memory, wherein the memory stores a plurality of haptic feedback signals, and the plurality of haptic feedback signals are generated according to the method for generating the haptic feedback signal in the embodiment of the present application in the first aspect.

In the third aspect, an embodiment of the present application provides an electronic device, comprising a memory and at least one processor, wherein the memory is configured to store at least one program, which when executed by the at least one processor, cause the at least one program to perform the method in the embodiment of the present application in the first aspect.

It can be seen from the above description that, compared with the related art, the present application has the following beneficial effects.

Firstly, an acquired initial haptic feedback signal is mapped from the time domain to the frequency domain to obtain an initial spectrogram of the initial haptic feedback signal in the frequency domain. Secondly, the amplitude value of a harmonic component of any frequency band in an initial spectrogram is adjusted to obtain a target spectrogram. Finally, a signal corresponding to a target spectrogram is mapped from the frequency domain to the time domain to obtain a target haptic feedback signal, and a haptic feedback device in an electronic device may output a corresponding haptic feedback action according to the target haptic feedback signal to achieve a corresponding haptic feedback effect. It can be seen therefrom that the initial spectrogram consists of a plurality of frequency bands. In the present application, the initial haptic feedback signal is converted into a new haptic feedback signal (i.e., the target haptic feedback signal) by adjusting the amplitude value of a harmonic component of any frequency band (one or more) in the initial spectrogram. It can be understood that, the frequency bands selected during amplitude adjustment are different, so that the obtained target haptic feedback signals are different, and different target haptic feedback signals correspond to different haptic feedback effects. Therefore, in the present application, a large number of target haptic feedback signals with different haptic feedback effects may be acquired by adjusting the amplitude value of the harmonic component of any frequency band in the initial spectrogram, thereby effectively improving the richness of the haptic feedback signal.

BRIEF DESCRIPTION OF THE DRAWINGS

In order to describe the technical solutions in the related art or the embodiments of the present application more clearly, the accompanying drawings required for describing the related art or the embodiments of the present application will be briefly introduced as follows. Apparently, the accompanying drawings in the following description are merely some embodiments of the present application, rather than all embodiments. For those skilled in the art, other drawings may also be obtained according to these accompanying drawings without creative efforts.

DETAILED DESCRIPTION OF THE EMBODIMENTS

In order to make the objects, technical solutions, and advantages of the present application clearer and more comprehensible, the present application will be clearly and completely described as follows with reference to embodiments of the present application and corresponding accompanying drawings. The same or similar reference numerals represent the same or similar elements or elements having the same or similar functions throughout. It should be understood that, each embodiment of the present application described below is only used to explain the present application, and is not intended to limit the present application. That is, based on each embodiment of the present application, all other embodiments obtained by those skilled in the art without creative efforts shall belong to the protection scope of the present application. In addition, technical features involved in various embodiments of the present application described below may be combined with each other as long as they do not conflict with each other.

Figure 1:
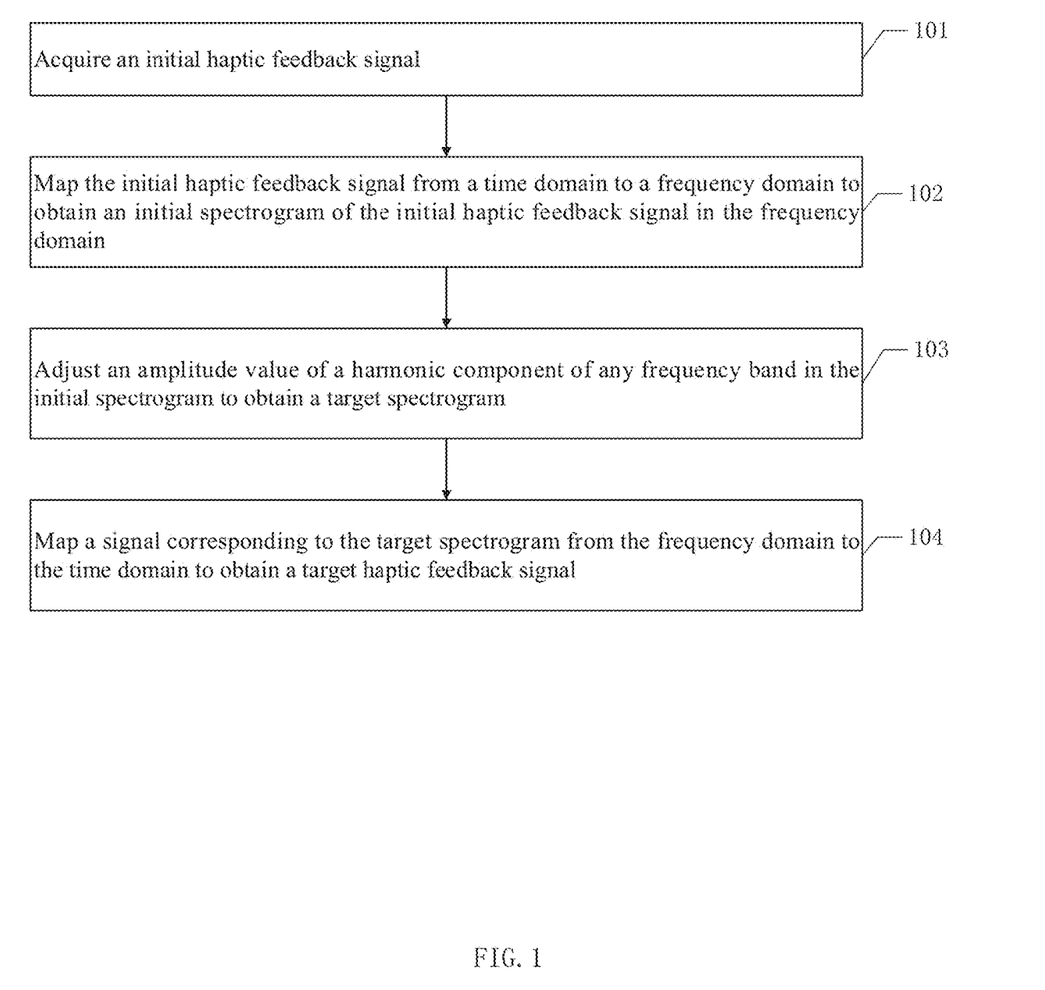
FIG. 1 is a flowchart of a method for generating a haptic feedback signal according to an embodiment of the present application.

Referring to FIG. 1, FIG. 1 is a flowchart of a method for generating a haptic feedback signal according to an embodiment of the present application, and the method includes steps 101 to 104 below.

Step 101: an initial haptic feedback signal is acquired.

In the embodiments of the present application, an initial haptic feedback signal needs to be acquired first when a required haptic feedback signal is generated, and the initial haptic feedback signal is generated according to a required haptic feedback effect. For example, in a fighting game, an electronic device needs to provide a user with a haptic feedback having a striking effect, and in this case, an initial haptic feedback signal may be generated according to a required striking effect. For another example, in a shooting game, the electronic device needs to provide the user with a haptic feedback having a firearm recoil effect, and in this case, an initial haptic feedback signal may be generated according to the firearm recoil effect. Specifically, the initial haptic feedback signal actually refers to a driving signal required by a haptic feedback device in the electronic device to output a haptic feedback action.

Step 102: the initial haptic feedback signal is mapped from the time domain to the frequency domain to obtain an initial spectrogram of the initial haptic feedback signal in the frequency domain.

Figure 2:
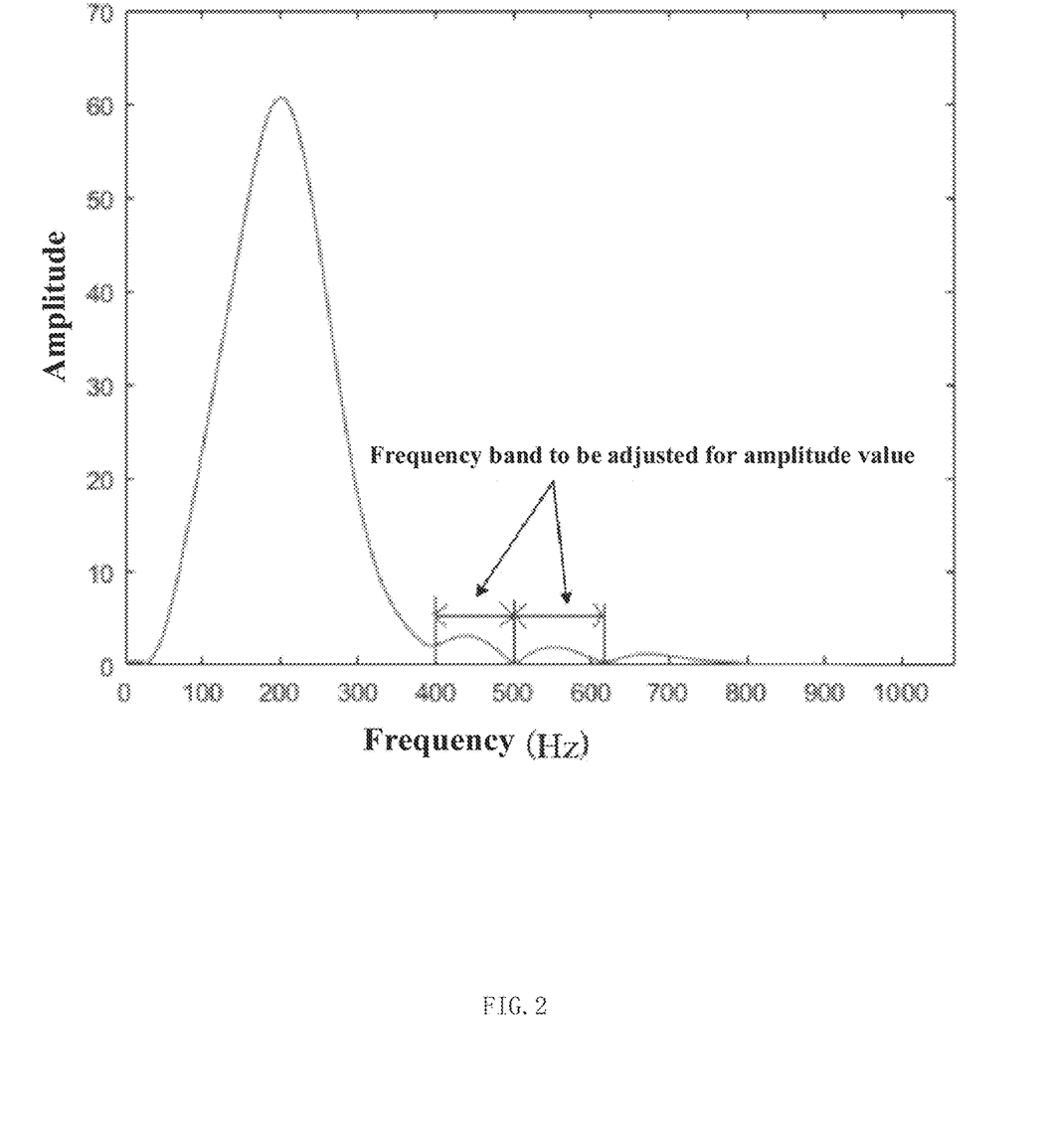
FIG. 2 is a diagram illustrating an initial spectrogram according to an embodiment of the present application.

In the embodiments of the present application, after the initial haptic feedback signal is acquired, the initial haptic feedback signal still needs to be mapped from the current time domain to the frequency domain, so as to obtain an initial spectrogram of the initial haptic feedback signal in the frequency domain. As an example, the initial spectrogram may be shown in FIG. 2.

Step 103: an amplitude value of a harmonic component of any frequency band in the initial spectrogram is adjusted, to obtain a target spectrogram.

In the embodiments of the present application, after the initial spectrogram is obtained, the amplitude value of the harmonic component of any frequency band (one or more) in the initial spectrogram needs to be adjusted, so as to obtain a target spectrogram. It can be understood that the initial spectrogram corresponds to the initial haptic feedback signal, and the harmonic component in each frequency band has a constant amplitude. After the amplitude value of the harmonic component of any frequency band in the initial spectrogram is adjusted through Step 103, a new spectrogram differing from the initial spectrogram is obtained, and the new spectrogram no longer corresponds to a new haptic feedback signal rather than the initial haptic feedback signal. The new haptic feedback signal is the target haptic feedback signal in the following Step 104.

Figure 3:
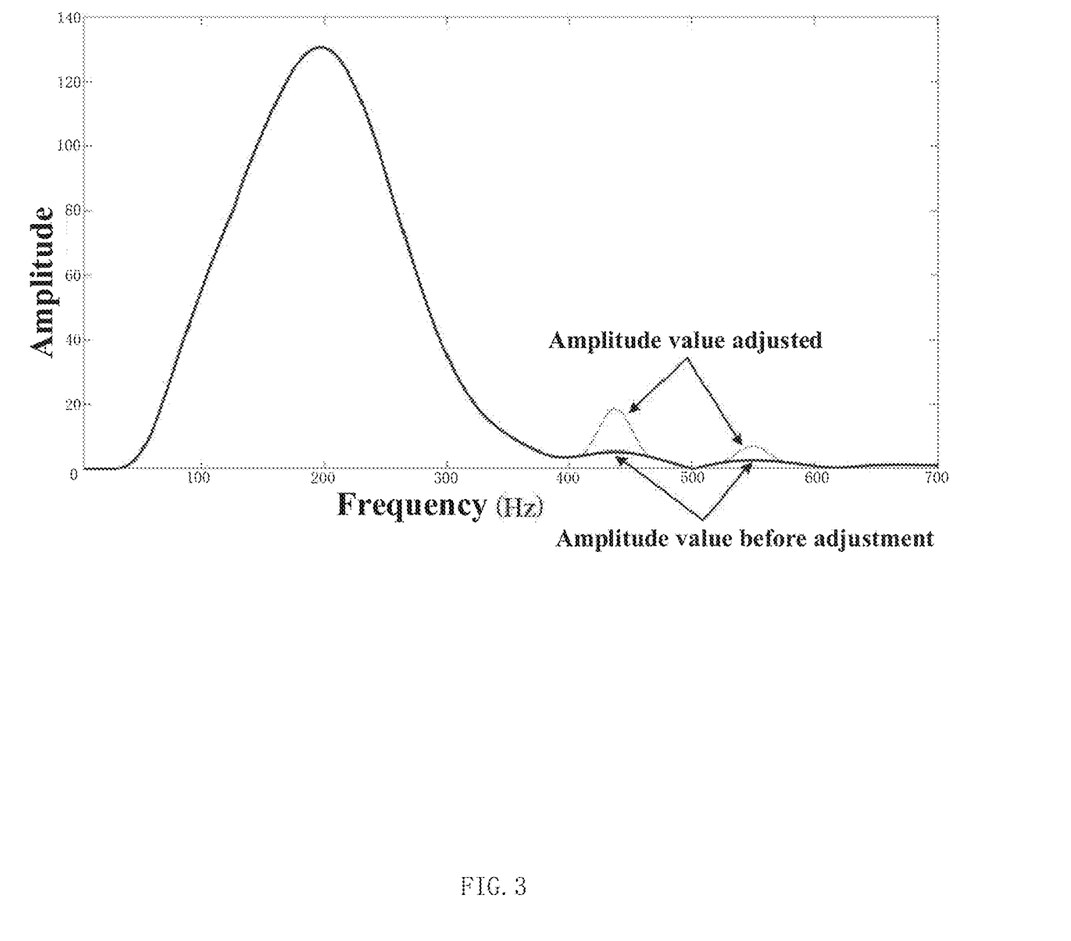
FIG. 3 is a comparison diagram between the initial spectrogram and a target spectrogram according to an embodiment of the present application.

For example, if a more focused, more straight haptic feedback is desired, the low-frequency harmonic components in the initial spectrogram may be suppressed, and the higher-order harmonic components in the initial spectrogram may be raised. Referring to FIG. 3, in the comparison diagram between the initial spectrogram before amplitude adjustment and the target spectrogram after the amplitude adjustment, the amplitude values of the harmonic components of two frequency bands of 400-500 Hz and 500-600 Hz in the initial spectrogram may be selected for adjustment, which may specifically increase an amplitude proportion of a high-order harmonic component in the two frequency bands.

Step 104: a signal corresponding to the target spectrogram is mapped from the frequency domain to the time domain, to obtain a target haptic feedback signal.

In the embodiments of the present application, after the target spectrogram is obtained, a new haptic feedback signal corresponding to the target spectrogram further needs to be mapped from the current frequency domain to the time domain, so as to obtain the new haptic feedback signal. The new haptic feedback signal is referred to as a target haptic feedback signal. It can be understood that, the target haptic feedback signal is a final haptic feedback signal. A target haptic feedback signal may be input to a haptic feedback device in the electronic device, so that the haptic feedback device can output a corresponding haptic feedback action according to the target haptic feedback signal to achieve a corresponding haptic feedback effect.

It can be seen from the above that the initial spectrogram consists of a plurality of frequency bands. In the embodiments of the present application, the initial haptic feedback signal is converted into a new haptic feedback signal (i.e., a target haptic feedback signal) by adjusting the amplitude value of the harmonic component of any frequency band in the initial spectrogram. It can be understood that, the frequency bands selected during amplitude adjustment are different, so that obtained target haptic feedback signals are different, and different target haptic feedback signals correspond to different haptic feedback effects. Therefore, in the embodiments of the present application, a large number of target haptic feedback signals with different haptic feedback effects may be obtained by adjusting the amplitude value of the harmonic component of any frequency band in the initial spectrogram, thereby effectively improving the richness of the haptic feedback signal. Moreover, since this process is realized by a software program, the haptic feedback signal may be implemented within a few seconds or even shorter, thereby shortening the time required for a designer to design a large number of haptic feedback signals and well satisfying the rapidity of haptic feedback signal generation.

In an embodiment, the step 101 may specifically include: an acceleration signal is acquired; and the acceleration signal is converted into a voltage signal to serve as the initial haptic feedback signal. The acceleration signal is generated according to a required haptic feedback effect, and the acceleration signal actually refers to an acceleration required by a haptic feedback device for outputting a haptic feedback action in an electronic device. For example, when the haptic feedback device is a linear motor, the acceleration signal indicates the acceleration required by the linear motor. That is to say, when the acceleration of the linear motor accords with the acceleration signal, the required haptic feedback effect may be achieved by the haptic feedback action output thereby.

In a specific implementation, the acceleration signal may be converted into the voltage signal according to an acceleration equalization formula. That is, the acceleration signal may be converted into the voltage signal according to an electromechanical coupling equation of a vibration system, and the electromechanical coupling equation of the vibration system is as follows:

$$\begin{cases} m\ddot{x} + c\dot{x} + kx = BLi \\ R_e i + L_e \dfrac{di}{dt} + BL\dot{x} = u \end{cases} ;$$

m is a mass of the rotor in the haptic feedback device. c is a mechanical damping of the haptic feedback device. k is a spring coefficient of the haptic feedback device. BL is an electromechanical coupling factor. $R_e$ is a resistance of the coil in the haptic feedback device. $L_e$ is an inductance of the coil. i is the current. u is the voltage. x is a displacement. $\dot{x}$ is a velocity ($\dot{x}$ means that the displacement takes a first derivative of time). $\ddot{x}$ is the acceleration ($\ddot{x}$ means that the displacement takes a second derivative of time).

It can be understood that the electromechanical coupling equation of the vibration system mainly relates to the conversion between the voltage and the displacement, and the form of conversion includes two types. One is a displacement response solution, i.e., the voltage is given, and the displacement, speed, or acceleration is calculated by means of the above-mentioned electromechanical coupling equation. The other is an equalization algorithm, i.e., the displacement, velocity, or acceleration are given, the voltage is calculated by the above-mentioned electromechanical coupling equation. The acceleration signal is converted into the voltage signal based on the equalization algorithm in this specific implementation.

In an embodiment, the step of mapping the initial haptic feedback signal from the time domain to the frequency domain in step 102 may specifically include: a Fourier transform is performed on the initial haptic feedback signal to map the initial haptic feedback signal from the current time domain to the frequency domain.

In a particular implementation, the Fourier transform is represented by the following formula:

$$\begin{cases} X(k) = \sum_{n=0}^{N-1} x(n) W_N^{nk} \\ W_N^{nk} = e^{-j \frac{2\pi}{N} nk} \end{cases} ;$$

$W_N^{nk}$ represents a rotation factor. k=0,1, . . . , N−1; and n=0,1, . . . , N−1.

Correspondingly, the step of mapping the signal corresponding to the target spectrogram from the frequency domain to the time domain in step 104 may specifically include: an inverse transform of Fourier transform is performed on the new haptic feedback signal (i.e., the target haptic feedback signal) corresponding to the target spectrogram, so as to map the new haptic feedback signal corresponding to the target spectrogram from the current frequency domain to the time domain.

In an embodiment, the step of adjusting the amplitude value of the harmonic component of any frequency band in the initial spectrogram in step 103 may specifically include: the harmonic component of any frequency band in the initial spectrogram is multiplied by a preset weighting function, so as to adjust the amplitude value of the harmonic component of the corresponding frequency band. It can be understood that, in this embodiment, the weight of the harmonic component of the frequency band that is not multiplied by the preset weighting function in the initial spectrogram is 1. That is, the amplitude value of the harmonic component remains unchanged.

In a specific implementation, the preset weighting function is a Hanning window function. Certainly, in other specific implementations, the preset weighting function may also be other weighting functions commonly used in the art, such as a linear function and a Gaussian window function. It can be understood that if the selected weighting functions are different, the adjustment degrees of the amplitudes are different. The parameters of the same weighting function are different, and the adjustment degrees of the amplitudes are also different. Besides, with regard to different frequency bands in the initial spectrum graph, the same weighting function may be adopted, and different weighting functions may also be adopted.

It should be noted that the above-mentioned implementation is only a preferred implementation of the embodiments of the present application, which is not the only limitation of the specific process of steps 101 to 104. In this regard, those skilled in the art may be set flexibly according to the practical application scenario on the basis of the embodiments of the present application.

Figure 4:
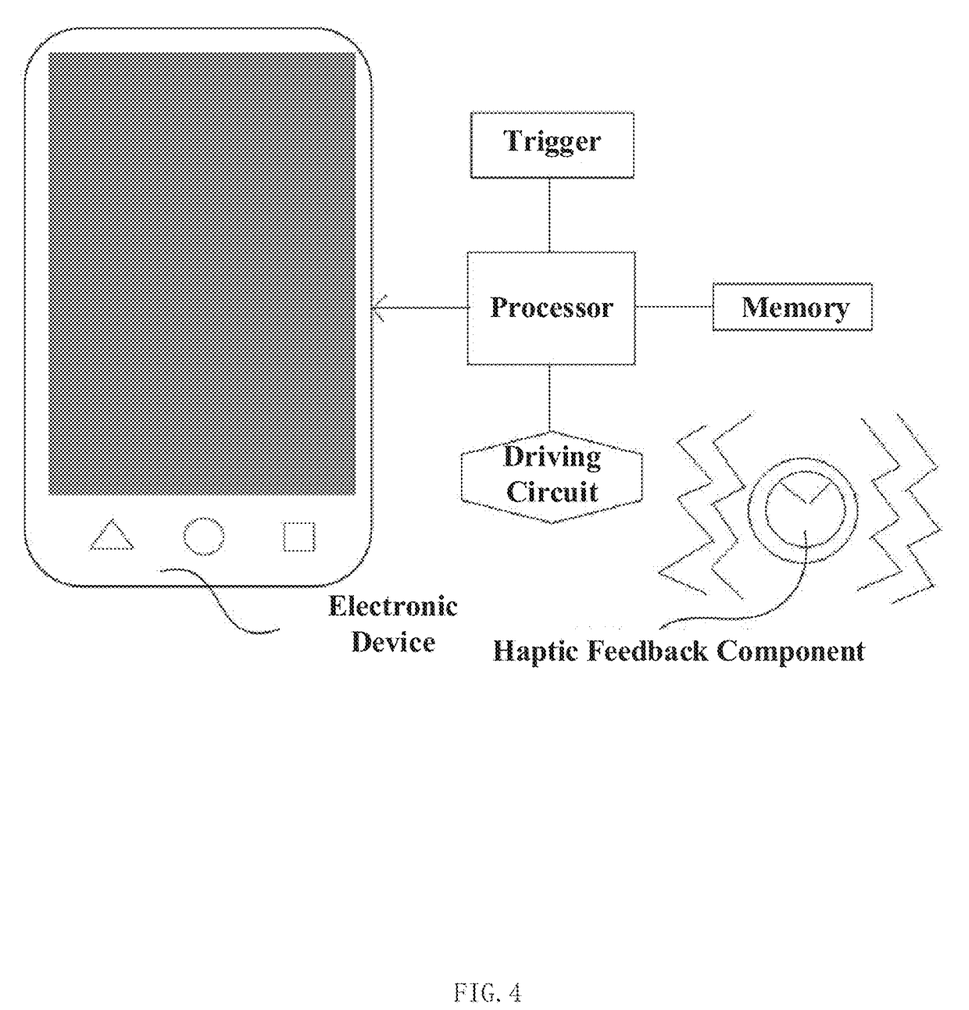
FIG. 4 is a block diagram of a first type of electronic device according to an embodiment of the present application.

Referring to FIG. 4, FIG. 4 is a block diagram of a first type of electronic device according to an embodiment of the present application. The embodiments of the present application further provide an electronic device. The electronic device includes a processor, a memory, and a haptic feedback component. The memory is configured to store a plurality of haptic feedback signals, and the plurality of haptic feedback signals are all generated according to the method for generating the haptic feedback signal according to the embodiments of the present application. The processor is configured to select different haptic feedback signals from the memory according to different trigger instructions, and input the selected haptic feedback signals to the haptic feedback device. The haptic feedback device is configured to output a corresponding haptic feedback action according to the received haptic feedback signal. In the embodiments of the present application, the haptic feedback device may include but is not limited to, a motor (such as a linear motor and an eccentric rotating mass motor) and a brake (such as a linear resonant brake and a piezoelectric brake). The haptic feedback action may include but is not limited to, a force and a vibration.

Further, the electronic device may further include a trigger configured to sense a trigger instruction input by the user and transmit the sensed trigger instruction to the processor. The trigger instruction may include, but is not limited to, clicking, long-pressing, short-pressing, sliding, and drawing of a specific graphic.

Further, the electronic device may further include a driving circuit configured to generate a driving signal according to the haptic feedback signal selected by the processor from the memory to drive the haptic feedback device to output a corresponding haptic feedback action.

Figure 5:
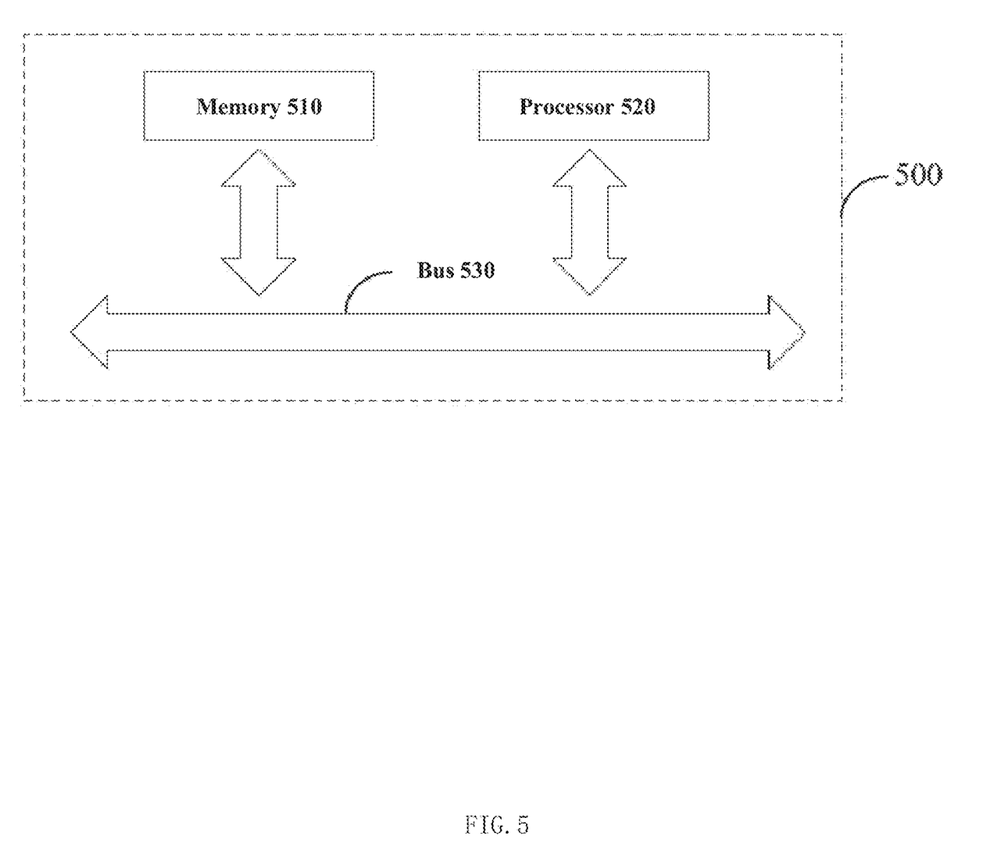
FIG. 5 is a block diagram of a second type of electronic device according to an embodiment of the present application.

Referring to FIG. 5, FIG. 5 is a block diagram of another electronic device according to an embodiment of the present application.

As shown in FIG. 5, the embodiments of the present application further provides another electronic device 500, including a memory 510 and at least one processor 520. The memory 510 is configured to store at least one program, and when the at least one program is executed by the at least one processor 520, the at least one processor 520 is enabled to execute the method for generating the haptic feedback signal according to the embodiments of the present application.

In some embodiments, the electronic device 500 may further include a bus 530 configured to establish a communication connection between the memory 510 and the at least one processor 520.

Figure 6:
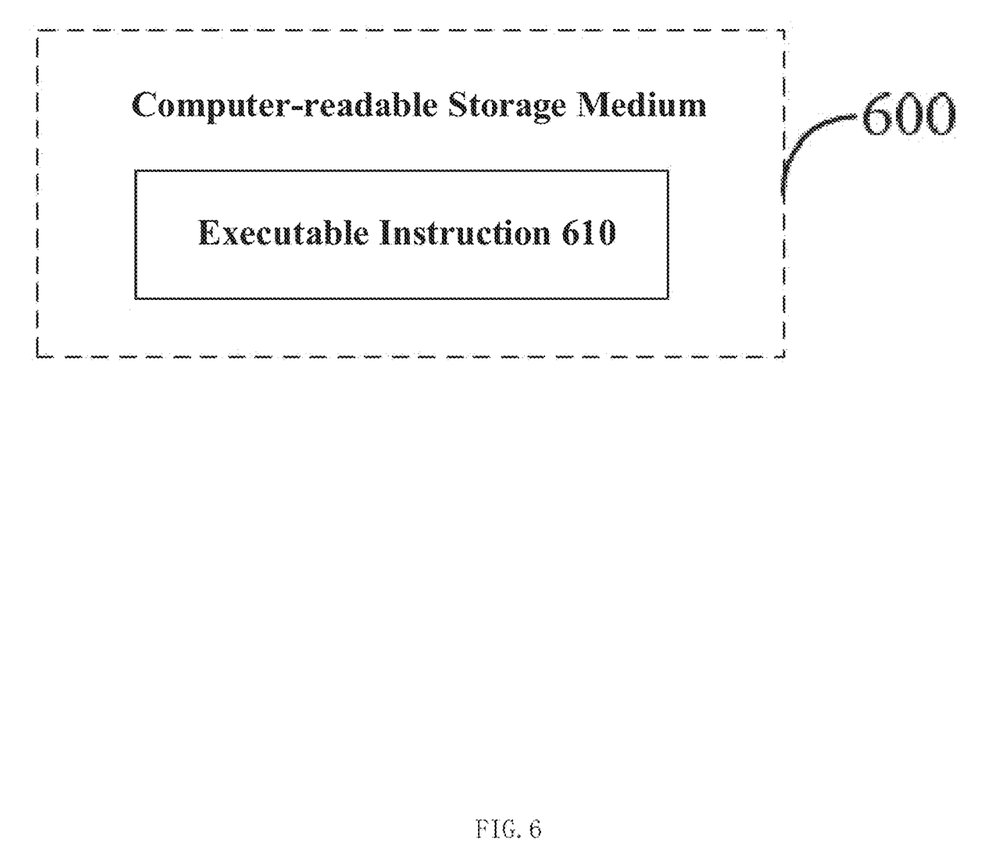
FIG. 6 is a block diagram of a computer-readable storage medium according to an embodiment of the present application.

Referring to FIG. 6, FIG. 6 is a block diagram of a computer-readable storage medium according to an embodiment of the present application.

As shown in FIG. 6, an embodiment of the present application further provides a computer-readable storage medium 600. The computer-readable storage medium 600 stores an executable instruction 610. When the executable instruction 610 is executed, the method for generating the haptic feedback signal according to the embodiment of the present application is executed.

Figure 7:
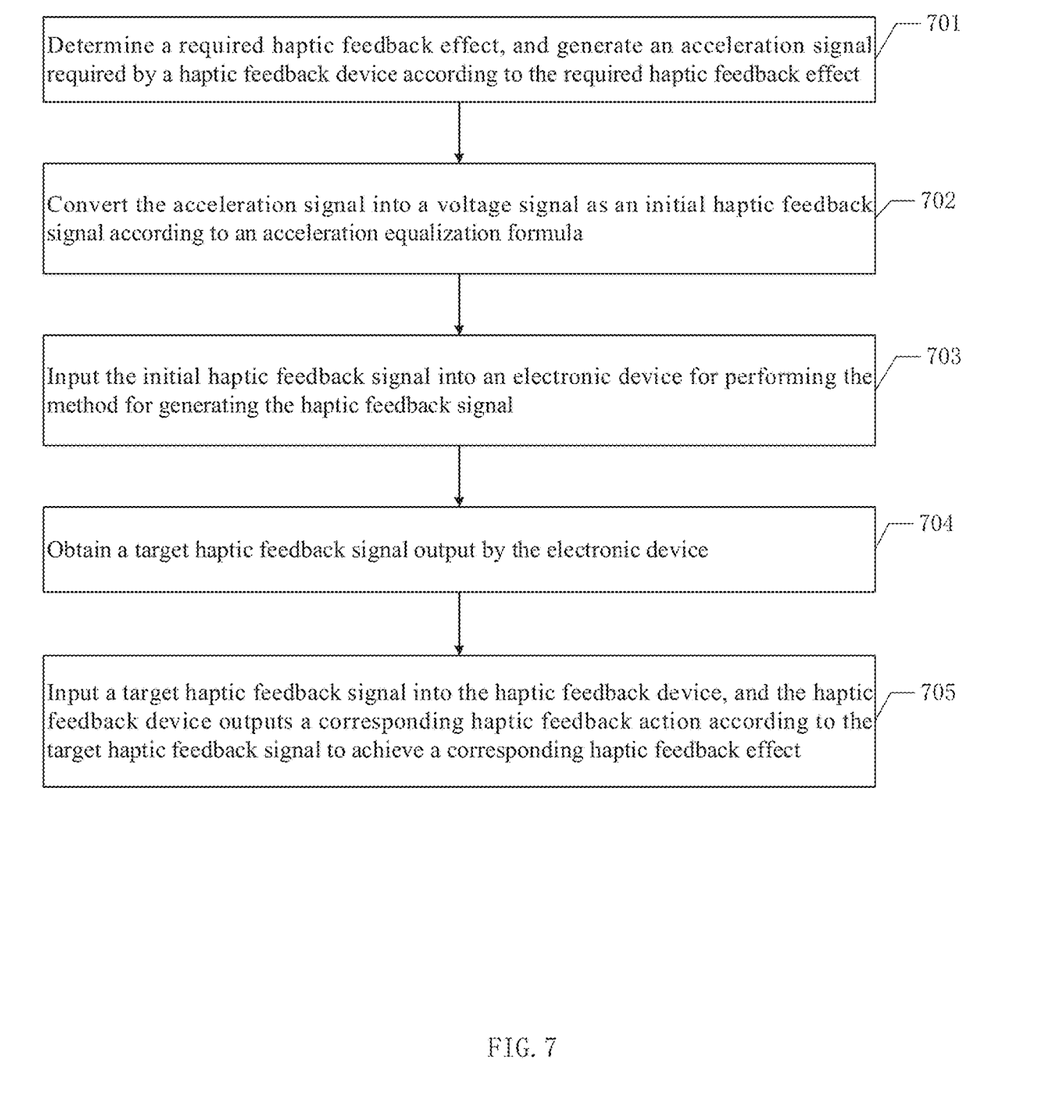
FIG. 7 is a flowchart illustrating a process of a haptic feedback signal from generating to using according to an embodiment of the present application.

In conclusion, the embodiments of the present application relate to the generation and utilization of a haptic feedback signal. Referring to FIG. 9, a process of a haptic feedback signal from generating to using is specifically as follows.

Step 701: a required haptic feedback effect is determined, and an acceleration signal required by a haptic feedback device is generated according to the required haptic feedback effect.

Step 702: the acceleration signal is converted into a voltage signal as an initial haptic feedback signal according to an acceleration equalization formula.

Step 703: the initial haptic feedback signal is input into an electronic device for performing the method for generating the haptic feedback signal according to the embodiments of the present application. The electronic device obtains a target haptic feedback signal different from an initial haptic feedback signal by performing the method for generating the haptic feedback signal according to the embodiments of the present application;

Step 704: a target haptic feedback signal output by the electronic device is obtained.

Step 705: a target haptic feedback signal is input into the haptic feedback device, and the haptic feedback device outputs a corresponding haptic feedback action according to the target haptic feedback signal to achieve a corresponding haptic feedback effect.

The more detailed process of each step in steps 701 to 705 may refer to the relevant part of the previous description, which will not be repeated in the embodiment of the present application.

The steps of the method or algorithm described in conjunction with the embodiments disclosed herein may be implemented directly with hardware, software modules executed by the processor, or a combination of the two. The software module may be placed in a random access memory (RAM), a memory, a read-only memory (ROM), an electrically programmable ROM, an electrically erasable programmable ROM, a register, a hard disk, a removable magnetic disk, a CD-ROM, or any other form of storage medium known in the art.

The above-mentioned embodiments may be implemented in whole or in part by software, hardware, firmware, or any combination thereof. When implemented using software, it may be implemented in whole or in part in the form of a computer program product. The computer program product includes one or more computer instructions. When the computer program instructions are loaded and executed on the computer, the processes or functions described in the present application are totally or partially generated. The computer may be a general-purpose computer, a special-purpose computer, a computer network, or other programmable apparatus. The computer instructions may be stored in a computer-readable storage medium or transmitted from one computer-readable storage medium to another computer-readable storage medium. For example, computer instructions may be transmitted from one website, computer, server, or data center to another website, computer, server, or data center in a wired (e.g., coaxial cable, fiber, digital subscriber line) or wireless (e.g., infrared, wireless, microwave) manner. The computer-readable storage medium may be any available media that can be accessed by a computer or a data storage device such as a server and a data center that includes one or more of the available media arrays. The available medium may be a magnetic medium, (e.g., floppy disk, hard disk, magnetic tape), an optical medium (e.g., DVD), or a semiconductor medium (e.g., solid state disk), or the like.

It should be noted that, each embodiment in the content of the present application is described in a progressive manner. Each embodiment focuses on a difference from other embodiments, and the same and similar parts between the embodiments may be seen from each other. Since the product-type embodiments are similar to the method-type embodiments, the description thereof is relatively simple, and reference may be made to the description of the method-type embodiments for related parts.

It should also be noted that, in the present application, relational terms such as first and second are only used to distinguish one entity or operation from another entity or operation, and do not necessarily require or imply any practical relationship or sequence between these entities or operations. Furthermore, the terms "include", "comprise", or any other variant thereof are intended to cover a non-exclusive inclusion, so that a process, a method, an article, or a device that includes a series of elements not only includes those elements, but also includes other elements that are not explicitly listed, or further includes elements inherent to the process, the method, the article, or the device. An element limited by "including a . . . " does not exclude other same elements existing in a process, a method, an article, or a device that includes the element, unless otherwise specified.

The above description of the disclosed embodiments enables those skilled in the art to implement or use the contents of the present application. Various modifications to these embodiments will be readily apparent to those skilled in the art. The general principles defined in the present application may be implemented in other embodiments without departing from the spirit or scope of the present application. Therefore, the contents of the present application are not limited to the embodiments shown in the contents of the present application, but should be accorded the widest scope consistent with the principles and novel features disclosed in the contents of the present application.

What is claimed is:

1. A method for generating a haptic feedback signal, comprising:
   acquiring an initial haptic feedback signal;
   mapping the initial haptic feedback signal from a time domain to a frequency domain to obtain an initial spectrogram of the initial haptic feedback signal in the frequency domain; comprising: performing a Fourier transform on the initial haptic feedback signal to map the initial haptic feedback signal from the time domain to the frequency domain;
   adjusting an amplitude value of a harmonic component of any frequency band in the initial spectrogram to obtain a target spectrogram; and
   mapping a signal corresponding to the target spectrogram from the frequency domain to the time domain to obtain a target haptic feedback signal, comprising: performing an inverse transform on the signal corresponding to the target spectrogram to map the signal corresponding to the target spectrogram from the frequency domain to the time domain; wherein the Fourier transform is represented by the following formula:

$$\begin{cases} X(k) = \sum_{n=0}^{N-1} x(n) W_N^{nk} \\ W_N^{nk} = e^{-j\frac{2\pi}{N}nk} \end{cases};$$

$W_N^{nk}$ represents a rotation factor; k=0,1, ..., N−1, and n=0,1, ..., N−1.

2. The method for generating the haptic feedback signal of claim 1, wherein the step of adjusting the amplitude value of the harmonic component of any frequency band in the initial spectrogram comprises:
   multiplying the harmonic component of any frequency band in the initial spectrogram by a preset weighting function to adjust the amplitude value of the harmonic component of any frequency band.

3. The method for generating the haptic feedback signal of claim 2, wherein the preset weighting function comprises any one of a linear function, a Hanning window function, and a Gaussian window function.

4. The method for generating the haptic feedback signal of claim 1, wherein the step of acquiring the initial haptic feedback signal comprises:
   acquiring an acceleration signal, wherein the acceleration signal indicates an acceleration required by a haptic feedback device for outputting a haptic feedback action in an electronic device, and the acceleration signal is generated according to a required haptic feedback effect; and
   converting the acceleration signal into a voltage signal as the initial haptic feedback signal.

5. The method for generating the haptic feedback signal of claim 4, wherein the step of converting the acceleration signal into the voltage signal comprises:
   converting the acceleration signal into the voltage signal according to an electromechanical coupling equation of a vibration system.

6. The method for generating the haptic feedback signal of claim 5, wherein the electromechanical coupling equation of the vibration system is as follows:

$$\begin{cases} m\ddot{x} + c\dot{x} + kx = BLi \\ R_e i + L_e \dfrac{di}{dt} + BL\dot{x} = u \end{cases};$$

wherein m is a mass of a rotor in the haptic feedback device; c is a mechanical damping of the haptic feedback device; k is a spring coefficient of the haptic feedback device; BL is an electromechanical coupling factor; $R_e$ is a resistance of a coil in the haptic feedback device; $L_e$ is an inductance of the coil; i is a current; u is a voltage; x is a displacement; $\dot{x}$ is a speed; and $\ddot{x}$ is an acceleration.

7. An electronic device, comprising a memory, wherein the memory stores a plurality of haptic feedback signals, and the plurality of haptic feedback signals are generated according to the method for generating the haptic feedback signal of claim 1.

8. The electronic device of claim 7, further comprising a processor and a haptic feedback device,
   wherein the processor is configured to select different haptic feedback signals from the memory according to different trigger instructions, and input the selected haptic feedback signals to the haptic feedback device, and
   the haptic feedback device is configured to output a corresponding haptic feedback action according to the received haptic feedback signal.

9. The electronic device of claim 8, wherein the haptic feedback device comprises any one of a motor and a brake.

10. An electronic device, comprising a memory and at least one processor, wherein the memory is configured to store at least one program, which when executed by the at least one processor, cause the at least one program to perform the method of claim 1.

* * * * *